(12) United States Patent
Srey et al.

(10) Patent No.: US 7,496,348 B2
(45) Date of Patent: Feb. 24, 2009

(54) WIRELESS COMMUNICATION NETWORK SECURITY METHOD AND SYSTEM

(75) Inventors: Lena Srey, Carpentersville, IL (US); Jesus Gonzalez, Chicago, IL (US); John M. Harris, Chicago, IL (US); Antoine S. Iskandar, Toronto (CA); Jessy Varghese, Des Plaines, IL (US)

(73) Assignee: Motorola, Inc., Schaumburg, IL (US)

( * ) Notice: Subject to any disclaimer, the term of this patent is extended or adjusted under 35 U.S.C. 154(b) by 632 days.

(21) Appl. No.: 11/146,822

(22) Filed: Jun. 7, 2005

(65) Prior Publication Data

US 2006/0276173 A1 Dec. 7, 2006

(51) Int. Cl.
H04M 3/16 (2006.01)

(52) U.S. Cl. .................. 455/410; 455/418; 455/419

(58) Field of Classification Search ............ 455/410, 455/418, 419, 101, 92, 455
See application file for complete search history.

(56) References Cited

U.S. PATENT DOCUMENTS

| | | | |
|---|---|---|---|
| 5,983,093 | A | 11/1999 | Haimi-Cohen |
| 6,301,668 | B1 | 10/2001 | Gleichauf et al. |
| 6,922,571 | B1 | 7/2005 | Kinoshita |
| 6,973,305 | B2 | 12/2005 | McLean |
| 7,069,051 | B1 | 6/2006 | Katz |
| 2002/0019216 | A1 | 2/2002 | Horiguchi |
| 2002/0073323 | A1 | 6/2002 | Jordan |
| 2002/0152399 | A1 | 10/2002 | Smith |
| 2003/0109275 | A1 | 6/2003 | Vander Veen et al. |
| 2003/0149897 | A1 | 8/2003 | Ylitalo et al. |
| 2003/0157930 | A1* | 8/2003 | Morota et al. ............... 455/418 |
| 2003/0162575 | A1 | 8/2003 | Morota et al. |
| 2005/0022012 | A1 | 1/2005 | Bluestone et al. |
| 2005/0086300 | A1 | 4/2005 | Yeager et al. |
| 2005/0091514 | A1* | 4/2005 | Fukumoto et al. ............ 713/188 |
| 2005/0148358 | A1 | 7/2005 | Lin et al. |
| 2005/0177534 | A1 | 8/2005 | Brorsson |
| 2006/0223496 | A1 | 10/2006 | Benco et al. |
| 2006/0276173 | A1 | 12/2006 | Srey et al. |
| 2007/0072616 | A1 | 3/2007 | Irani |
| 2007/0123214 | A1* | 5/2007 | Mock ......................... 455/410 |

OTHER PUBLICATIONS

Muriel, Diana: "Threat of mobile virus attack real", CNN.com-Threat of mobile virus attack real—Oct. 15, 2003, p. 1-3, http://www.cnn.com/2003/TECH/10/15/itu.security/.

* cited by examiner

*Primary Examiner*—Alexander Eisen
*Assistant Examiner*—Justin Y Lee

(57) ABSTRACT

A security method (100) in a radio access network can include monitoring (102) (by either a base station controller or a mobile radio) for one or more abnormalities among CPU utilization, memory storage, memory read-write, malicious incoming or outgoing messages, and virus file names, notifying (104) of a specific abnormality detected, and receiving (108) access, conditional access or limited access based on the specific abnormality detected. The method can further include receiving updates (112) used for monitoring the abnormalities. The method can further include the optional step (106) of issuing a notification from a mobile radio to a base station controller if the specific abnormality is detected and suspending (110) one or more services based on the specific abnormality detected. The method can further include receiving (114) at the mobile radio an over the air programming instruction to suspend a specific service and alerting the mobile radio.

18 Claims, 5 Drawing Sheets

FIG. 1
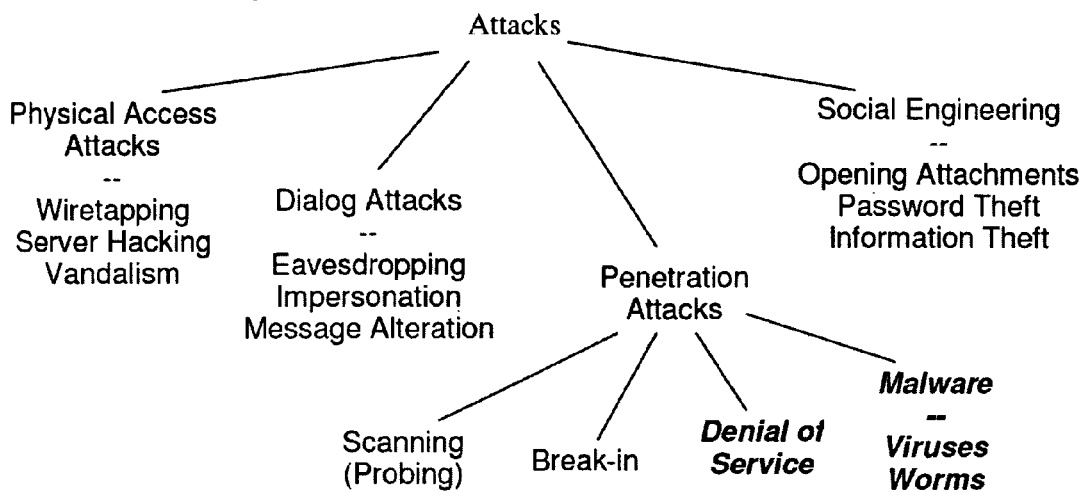
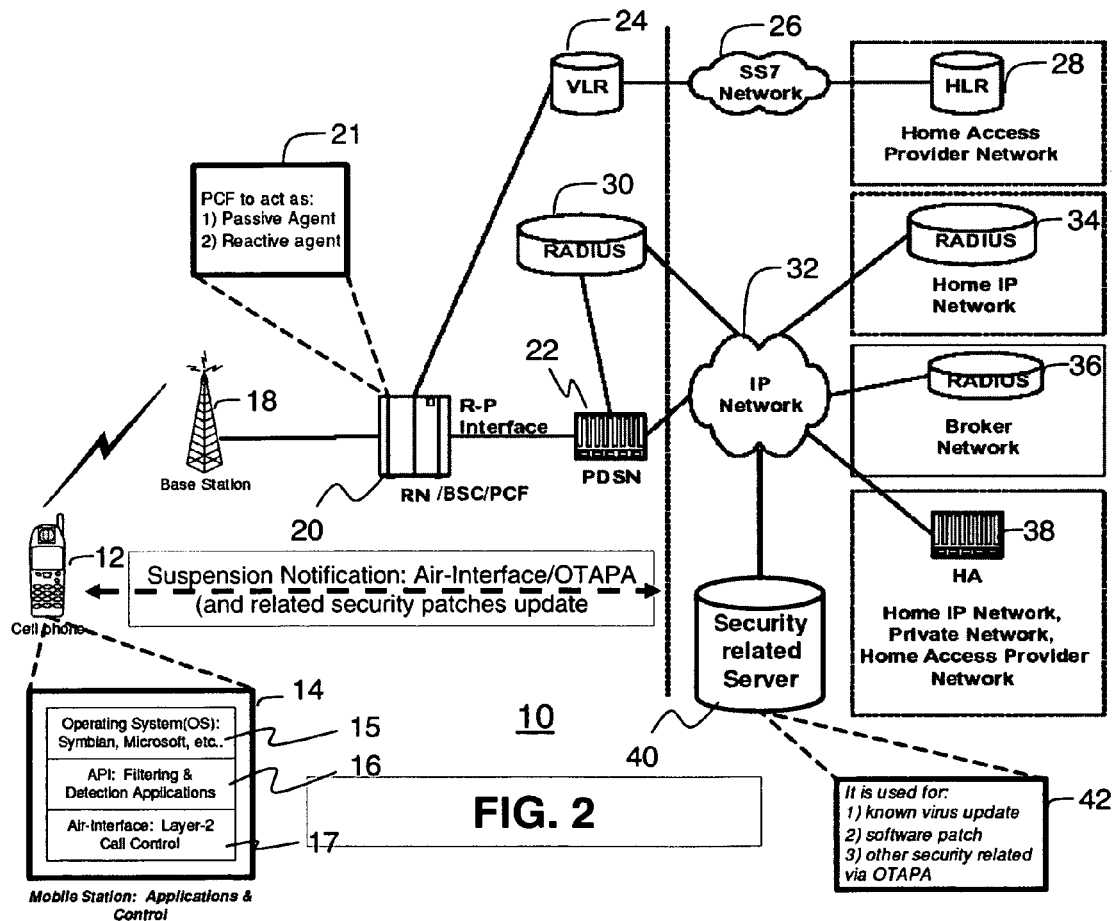
FIG. 2

FIG. 3

| RETURN_CAUSE (Binary) | REDIRECTION FAILURE CONDITION |
|---|---|
| 0000 | Normal access. |
| 0001 | Service redirection failed as a result of system not found. |
| 0010 | Service redirection failed as a result of protocol mismatch |
| 0011 | Service redirection failed as a result of registration rejection. |
| 0100 | Service redirection failed as a result of wrong SID |
| 0101 | Service redirection failed as a result of wrong NID |
| *0110* | *Explicit Notification of Service has been compromised* |
| *0111* | *Explicit Notification that infected service has been cleaned* |
| Reserved | Reserved |

FIG. 4

| Value (Binary) | Assignment Mode |
|---|---|
| 000 | Traffic Channel Assignment |
| 001 | Paging Channel Assignment |
| 010 | Acquire Analog System |
| 011 | Analog Voice Channel Assignment |
| 100 | Enhanced Traffic Channel Assignment |
| *101* | *Explicit Request Suspension of service(s)* |

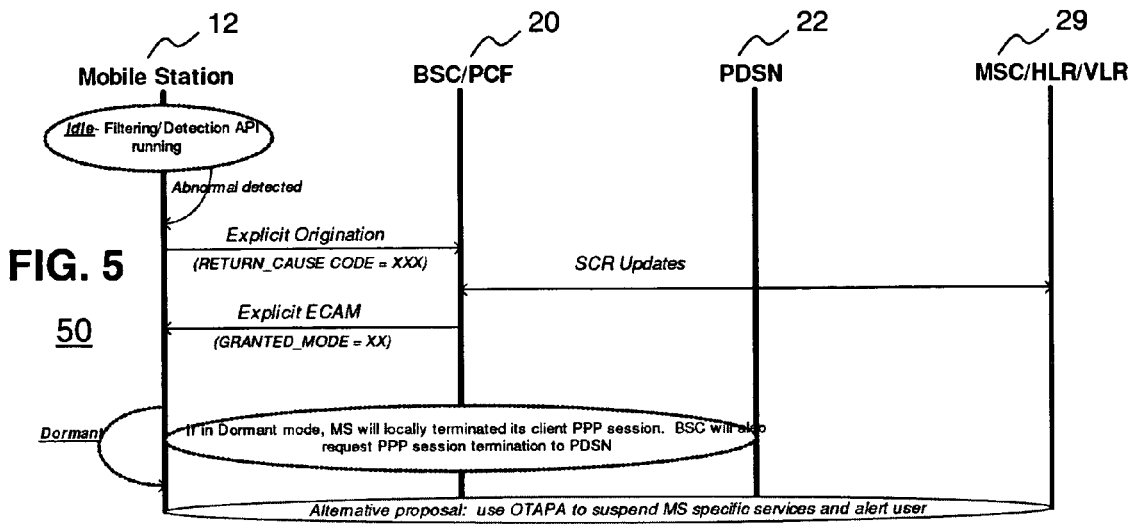
FIG. 5
50
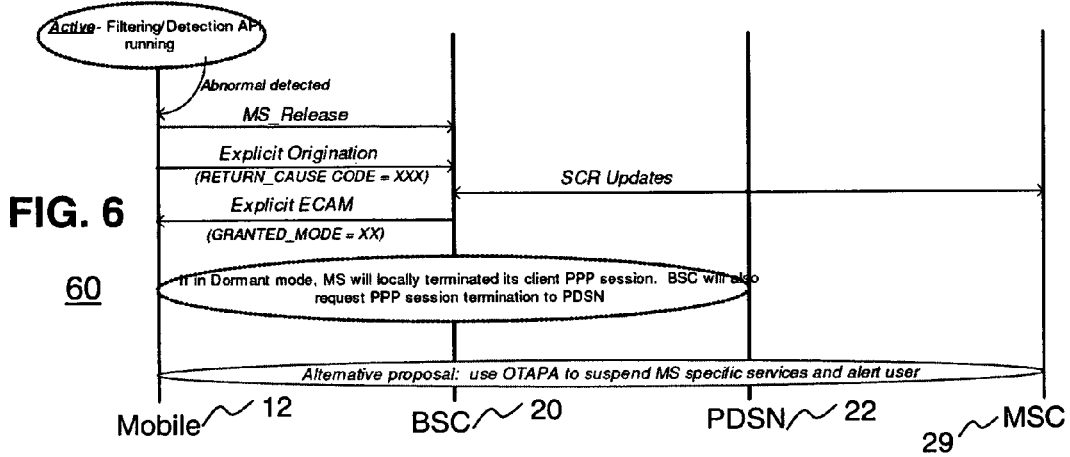
FIG. 6
60
FIG. 7
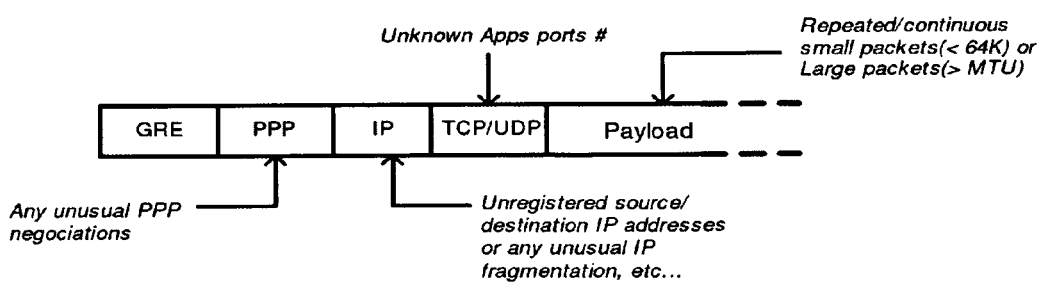

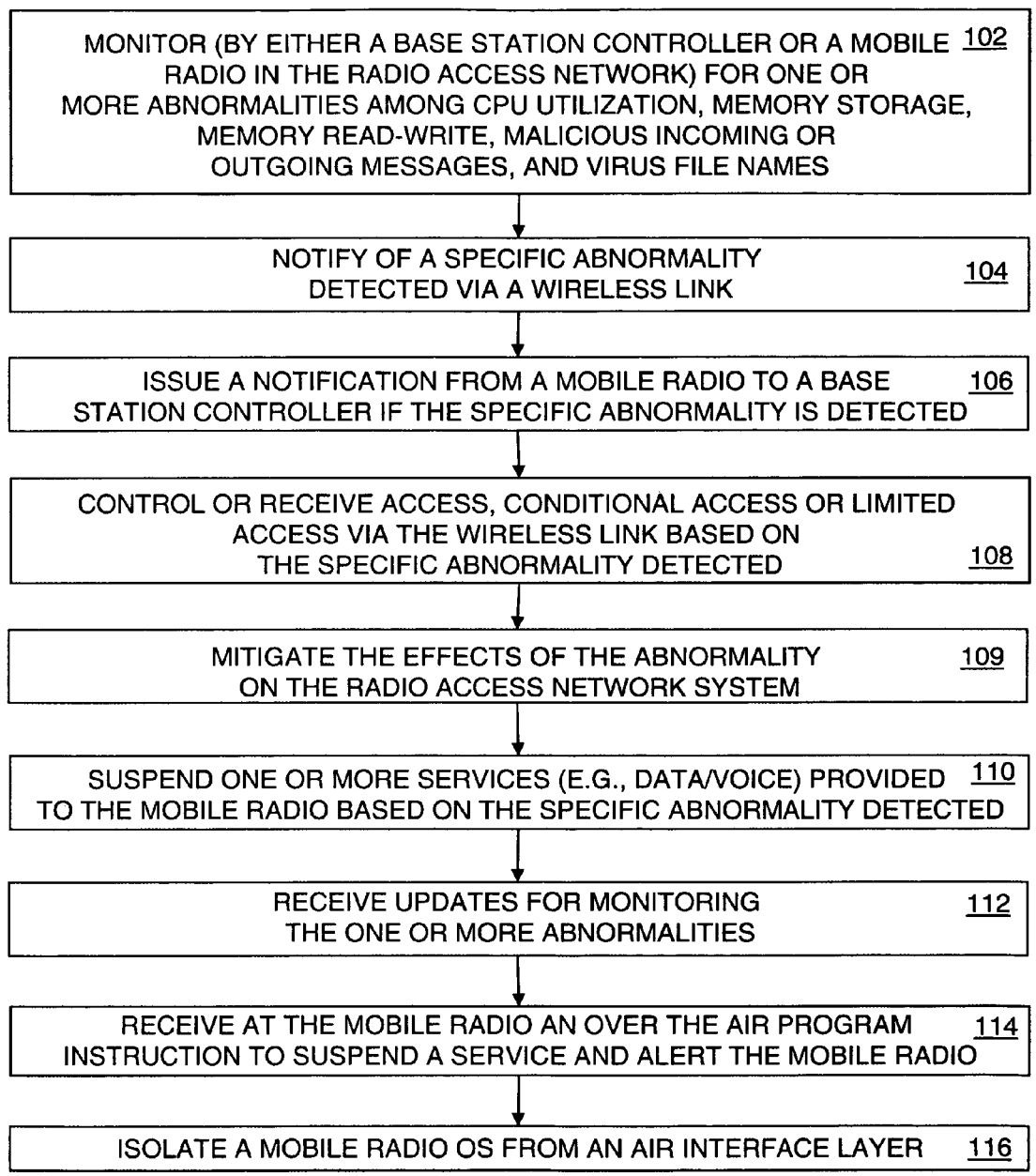

WIRELESS COMMUNICATION NETWORK SECURITY METHOD AND SYSTEM

FIELD OF THE INVENTION

This invention relates generally to methods and systems to protect wireless communication networks from security breaches and malicious attacks, and more particularly to systems and methods at a mobile radio or a base station or using software in a communication system that will mitigate or eliminate such security breaches or attacks.

BACKGROUND OF THE INVENTION

The evolution of mobile technology from a simple telephone with capabilities such as an organizer to a more intelligent and sophisticated miniature computing device including gaming, video streaming, or web-based applications has been one of the goals of the mobile manufacturers. In recent years, vendors in the cellular market aimed at providing more user desirable features in an attempt to increase their subscription rate. As these additional implemented features and functions become more user oriented and controlled, the associated vulnerabilities in this technology also increases.

Although most of the attention in wireless security is geared toward authentication and encryption technologies that typically cause a complete denial of use, relatively little attention is geared towards mobile security where user on a mobile radio has already been authenticated. Security experts have been giving ample warnings for required improvements in this area. There is no technology that is hacker-proof and the recent scares such as the "Cabir" virus/worm that infected the Symbian operating system that runs on a number of mobile radios, including the Nokia brand is actual proof of the forthcoming challenges. Diana Muriel of CNN in her article entitled "Threat of mobile virus attack real" on Oct. 15, 2003 stated that "Windows operating system has been on the receiving end of more than 60,000 viruses" and believes this trend is going to be followed by many imitators as well as new types of security concerns. Therefore it becomes a necessity to introduce and implement intrusion-detection and resolution measures before the problems get out of control. Once a mobile gets infected, it could launch a malicious chain reaction of attacks (mutation attacks) directed towards other mobile stations in a network as well as the network itself.

Currently, there are authentication and encryption technologies that are being proposed by the IS2000C/D and other wireless standards. The proposals are for the complete denial of unauthorized users and users' data integrity, however, there is no specific implementation or technology to prevent or suspend only the specific services of an infected portable-mobile device, or malicious mobile devices that have already been authenticated from accessing the wireless network and potentially compromising the entire network by causing one or more among a system outage, reduced services to other users, system flooding with malicious traffic, or a chain reaction or infections.

SUMMARY OF THE INVENTION

Embodiments in accordance with the present invention can provide prevention, detection, and action/recovery from an attack on a mobile radio or its infrastructure by reducing or constraining the impact a virus can have on the infrastructure or other mobile phones. Embodiments herein aid in the detection of any intrusions as well as situations where the virus has already infiltrated either the mobile or a radio access network. Current mobile and infrastructure architecture lack a protection zone against intrusions that both currently exist as well as those that may become more apparent and prominent in resolving and ensuring that the mobile and its associated services are not completely compromised.

In a first embodiment of the present invention, a security method in a radio access network can include the steps of monitoring (by either a base station controller or a mobile radio in the radio access network) for one or more abnormalities among CPU utilization, memory storage, memory read-write, malicious incoming or outgoing messages, and virus file names, notifying of a specific abnormality detected via a wireless communication link, and receiving access, conditional access or limited access via the wireless communication link based on the specific abnormality detected. The method can further include the step of receiving updates used for monitoring the one or more abnormalities. The method can further include the steps of issuing a notification from a mobile radio to a base station controller if the specific abnormality is detected and suspending one or more services being provided to the mobile radio based on the specific abnormality detected. In this regards, the method can include the step of issuing a notification from a mobile radio and receiving a response from a base station controller causing the mobile radio to perform one of the functions among suspending data services, suspending data services and voice services, canceling suspension of data services, and canceling suspension of data services and voice services. The method can further include the step of receiving at the mobile radio an over the air programming instruction to suspend a specific service and alerting the mobile radio. The method can further include the step of isolating a mobile radio operating system from an air interface layer. In this manner denial of service attacks can be prevented by monitoring behavior of mobile radios in communication with the radio access network and flagging the specific abnormality detected. Also, packet data service at a mobile radio can be suspended upon detection of a malicious software routine in the mobile radio while continuing to enable voice or circuit data calls.

In a second embodiment of the present invention, a radio access network security system can include a transceiver and a processor coupled to the transceiver. The processor can be programmed to monitor for one or more abnormalities among CPU utilization, memory storage, memory read-write, malicious incoming or outgoing messages, and virus file names, to notify of a specific abnormality detected among the one or more abnormalities via a wireless communication link, and to receive access, conditional access or limited access via the wireless communication link based on the specific abnormality detected. If an abnormality is detected, the system can then (for example) perform at least one among the functions of disabling an infected service for a predetermined amount of time, refusing a resource assignment for a flagged application, redirecting the mobile radio to an analog service, instructing other geographically nearby mobile radios to increase their security level, instructing other geographically nearby mobile radios to run virus software (which can include as examples instructing to remove any existing infection or increase security settings to prevent future infections or to download a latest virus software update), preventing peer-to-peer communications, preventing access to a mobile radio's address book, buddy list or recent call list, instructing the mobile radio to enter into a battery draining mode, and instructing the mobile radio to enter a location finding mode.

In a third embodiment of the present invention, a radio access network system can include a transceiver and a processor coupled to the transceiver. The processor can be programmed detect an abnormality (virus, inconsistent location, etc.) in an application within a mobile radio in communication with the radio access network system, control access by the mobile radio to resources on the radio access network system selectively while enabling access for the mobile radio to other resources on the radio access network system, and run one or more mitigation functions that mitigate the effects of the abnormality on the radio access network system. Note, the processor can control access to resources by performing one or more of the functions selected from restricting access to a mobile radio's (the mobile radio infected or other mobile radios in possible or potential communication with the infected mobile radio) address book, buddy list, or recent call list, increasing security at wireless devices in potential communication with the mobile radio (again, considering address books, buddy list, recent call lists, hot lists, etc.), restricting access to a particular service application, or redirecting service to a less attack-susceptible service (such as analog service). The one or more mitigation functions can be selected among the functions of alerting other mobile radios nearby the mobile radio with the abnormality, causing such nearby mobile radios to increase their security level or run virus software, instructing the mobile radio to drain its power source, or enabling the tracking of the mobile radio. Note, the term "nearby" is not necessarily limited to mobile radios that are geographically and physically nearby, but may also or can optionally include mobile radios that could potentially be in contact with the infected mobile radio. For example, alerts and instructions to raise security levels or run virus software can be sent to mobile radios in close proximity, but to other mobile radios that can be anywhere that also happen to be in a memory storage (address book, buddy list, recent call list, hot list, etc.) of the mobile radio or in a memory storage in the radio access network that is somehow associated with the infected mobile radio.

Other embodiments, when configured in accordance with the inventive arrangements disclosed herein, can include a system for performing and a machine readable storage for causing a machine to perform the various processes and methods disclosed herein.

BRIEF DESCRIPTION OF THE DRAWINGS

FIG. 1 is an illustration of a broad array of attacks that mobile radios and its infrastructure are subject to in accordance with an embodiment of the present invention.

FIG. 2 is a block diagram of a radio access network including a mobile radio in accordance with an embodiment of the present invention.

FIG. 3 is a modified table of "RETURN_CAUSE" Codes that can be utilized in accordance with an embodiment of the present invention.

FIG. 4 is an table of Assignment Mode code in accordance with an embodiment of the present invention.

FIG. 5 is a timing diagram of a mobile radio assisted notification and suspension of services with updates in accordance with an embodiment of the present invention when the mobile radio is in an idle mode.

FIG. 6 is a timing diagram of a mobile radio assisted notification and suspension of services with updates in accordance with an embodiment of the present invention when the mobile radio is in an active mode.

FIG. 7 illustrates a packet control function monitoring of packets at a base station controller in accordance with an embodiment of the present invention.

FIG. 9 is a flow chart illustrating a security method in a radio access network in accordance with an embodiment of the present invention.

DETAILED DESCRIPTION OF THE DRAWINGS

Figure 8:
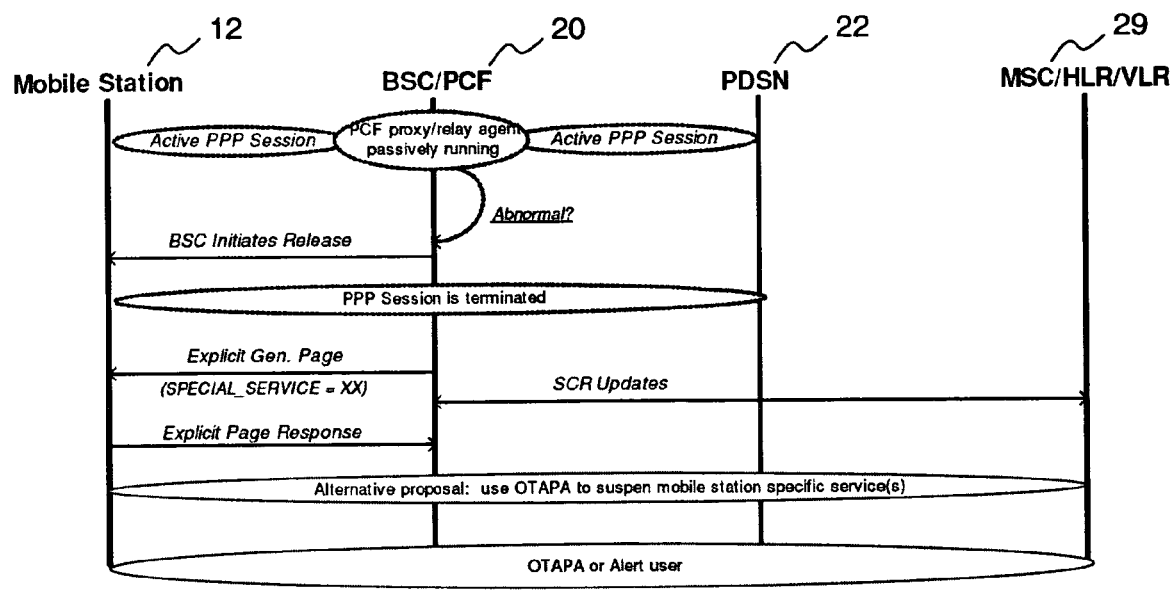
FIG. 8 is a timing diagram of a base station controller assisted notification and suspension of services with update in accordance with an embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

Embodiments herein can include combinations of implementations and algorithms that work between a portable-mobile device (such as a mobile radio or a computer laptop with wireless access) and radio access network software. In one embodiment, software can be used as an automated reactive mechanism to compensate for the various problems noted above by issuing notifications and/or suspension of the services based on the particular problems encountered. A broad list of some of the attacks that can be defended against using several of the embodiments herein are illustrated in FIG. 1 and include attacks such as physical access attacks including wiretapping, server hacking, and vandalism, and dialog attacks such as eavesdropping, impersonation, message alteration, and penetration attacks such as scanning (probing), break-in, Denial of Service (DoS), Malware, Viruses, and Worms, and social engineering such as opening attachments, password theft, information theft.

Referring to FIG. 2, a wireless network system 10 in accordance with an embodiment of the present invention includes implementation for both a mobile radio 12 such as a cellular phone and a base station controller (BSC) 20 having a packet control function 21. The BSC 20 can be coupled to one or more base station transceivers 18, a visitor location register (VLR) 24 and a packet data serving node (PDSN) 22 forming a portion of a visited access provider network. The VLR 24 can be coupled to a Home Location Register (HLR) 28 via an SS7 network or a mobile switching center 26. The PDSN 22 can be coupled to one or servers either directly (as done with a server 30) or via an IP network 32 as done with server 34 (for a home IP network for example), or server 36 (for a broker network for example), or home agent server 38 (for a home IP Network, Private Network, or Home Access Provider Network for example), or security related server 40.

The mobile radio 12 can include applications and control 12 having an Application Program Interface (API) 16 for filtering and detection that resides (or alternatively can be embedded into an OS kernel) between a mobile station operating system (OS) 15 and air-interface layer-2 call control layer 17. The API 16 in a filtering and detection role monitors any abnormality of CPU utilization, memory storage, memory read/write, malicious incoming/outgoing file(s)/messages, and any known virus file names (Trojan, sasser, etc. . . . ). The software application for this can be acquired off the shelf to implement with the mobile radio 12 and can be OS-specific, but implementations are not necessarily limited to a particular OS. Also, known virus file names can be acquired over-the-air by OTAPA between BSC 20 and a mobile radio or station 12 or by user requested updates, either of which can be obtained from a security related server 40 having updates 42 for known viruses, software patches, and other security related information.

One of the "abnormalities" that can be detected besides an infected application on a mobile radio can include a location reported by the mobile radio that is inconsistent with a location reported by a base station or radio access network in communication with such mobile radio. If an abnormality is found, air interface messaging can be used to deny resources in a selective manner to the offending mobile radio (selective suspension of HTTP, FTP, mail (SMTP+POP 3), ICMP or others). In one example using the CDMA2000 protocol, the FTCH ServiceOptionControl function can be used to prevent an offending service from operating for a predetermined amount of time. Other alternatives can include refusing resource assignments or allocation for the offending application or redirecting service to an analog service or to other carriers that do not provide data services for example. The system can also assist in tracking infected users or infection proliferators by making location queries that can provide among other things a base transceiver station location or a mobile radio location based on GPS or triangulation or other nearby communication device ID.

In another scenario where an infection or abnormality is detected, the system can still grant resources for voice calls and particularly for 911 calls or other emergency related calls while denying other service such as data service that are likely to proliferate any offending attack. Even where the mobile radio is somehow corrupted to repeatedly make 911 calls, a system in accordance herein can also detect calls hung up by the 911 operator to provide an indication that the call is not real and create a flag as either a low priority or spurious call that is detected by a 911 call center.

Also, where an infection or abnormality is detected, the system herein can instruct other geographically nearby mobile radios to increase their security level or to alternatively run virus software. The system can further include preventing peer-to-peer communications such as Bluetooth communications in order to prevent or mitigate the spread of such infections to other mobile radios. Furthermore, access can be denied to the mobile radio's address book, buddy list or a recent call list and devices corresponding to the members in the address books, buddy lists or recent calls lists can be alerted and instructed to increase their security levels. In another attempt to mitigate infections, the system can attempt to drain the battery life of the battery operating the mobile radio in an number of ways. For example, the mobile radio can be instructed to enter into an "unslotted mode" (with QPCH/PICH turned off) that effectively drains the battery life much faster and thereby potentially eliminates the potential problem sooner as well. The mobile radio can also be instructed to enter into a tracking mode to enable easier location finding of the offending mobile radio. Furthermore, instructing the mobile radio to enter into a more precise tracking mode will cause the battery life to drain faster as well.

The API 16 can monitor IP ports and provide intrusion detection and provide policy enforcement of a particular OS. For example, the API 16 can ensure that no buffer overflow occurs to allow certain programs to acquire system resources and can further ensure that no transmission/reprogramming of MID/ESN (Mobile identification or electronic serial number) to acquire more system resources. The API 16 also shields and isolates the OS 15 and air-interface Layer-2 Call Control 17. If mobile station OS 15 gets infected, the API 16 can shield the Layer-2 Call control 17 (based on Service Option or type of call being attempted) from being infected so that other configurable services like voice or circuit data are still operational. The API 16 can also periodically provide feedback of critical data to the Call Control (17) for decisions and updates.

Note, layer 2 and layer 3 call control in a cellular phone can be in an Idle, Dormant or Active state. Upon receiving critical data from the API 16 that the mobile radio OS 15 and its applications are compromised (in Idle state), the call control layer 17 can notify the radio access network (RAN) via an explicit origination message (See "RETURN_CAUSE" table code "0110" in FIG. 3) that can include an element_field signifying or representing "compromised" and waits for a response from the RAN via an explicit Extended Channel Assignment Message (ECAM) as shown in FIG. 5. Based upon the GRANTED_MODE (as shown in FIG. 4, code "101"), Layer-2 or 3 Call control 17 will alert a user of the mobile radio 12 to take action and starts to suspend the service.

If the mobile radio 12 is in active state, Layer-2 Call Control 17 can teardown the call, locally terminate any PPP session, and send the explicit origination to the RAN. If the mobile radio 12 is in dormant state, Layer-2 Call Control 17 can locally terminate the PPP session and send an explicit origination to the RAN. While in the suspension state, call control 17 can monitor the feedback data from the API 16 to figure out whether the suspension state can be lifted or cancelled and notify the RAN via an explicit origination message with RETURN_CAUSE of "0111" (see FIG. 3) representing that the infected service has been cleaned. Layer 17 can also monitor for OTAPA related configuration messages for BSC (20) assisted service.

Referring to FIGS. 3 and 4, proposed messages and message elements can map to the Explicit Origination, General Page, Page Response, and ECAM codes used for cdma2000 signaling standards. With respect to an Explicit Origination, a "RETURN_CAUSE" message element can be set as in a modified table 2.7.1.3.2.1 as shown in FIG. 3, modified so that no changes to the "Upper Layer (Layer 3) Signaling Standard for cdma2000" for Spread Spectrum Systems is needed. Likewise, an Explicit ECAM message element can be implemented without any changes to the Standard where an Assignment Mode similar to Table 3.7.2.3.2.21-1. from the "Upper Layer (Layer 3) Signaling Standard for cdma2000 Spread Spectrum Systems as shown in FIG. 4 and a GRANTED_MODE can be implemented. With a new ASSIGN_MODE as shown in FIG. 4, the GRANTED_MODE message element can be set where if ASSIGN_MODE='101', the additional record fields can be a GRANTED_MODE (of 2 bits, for example) that can include 00 (for Suspension of data service cancelled), 01 (for Suspension of both voice & data services cancelled), 10 (for Suspension of data services), and 11 (for Suspension of voice & data services).

The Explicit General Page Message can be a SPECIAL_SERVICE message element proposed for a BSC assisted implementation for a mobile radio-addressed page. Currently, this message element has 1 bit length, but embodiments herein can increase the Field_Length to 2 bits to provide a PDU Format for a mobile radio-addressed page having Field Length (bits) of 2-bits SPECIAL_SERVICE 2 codes of 00 (for Suspension of data service cancelled), 01 (for Suspension of both voice & data services cancelled), 10 (for Suspension of data services), and 11 (for Suspension of voice & data services). Finally, the Explicit Page Response Message can be a modified Page Response as an acknowledgement or ACK to an Explicit General Page Message.

In a Radio Access Network (RAN) implementation for providing the defense mechanisms as contemplated herein, an enhanced algorithm to receive an explicit origination message and grant or deny mobile radio services via an ECAM defined message can be done using the Assign Mode table shown in FIG. 4. While the mobile station or radio is in suspension state, the RAN can store and keep monitoring the explicit origination message for any updates.

Suspension operations can be mobile radio assisted, base station controller assisted or possibly both. In a mobile radio or station assisted scheme, when the mobile radio is in an "Idle state", the RAN can monitor for the explicit origination messages and check for a "compromised" flag and respond via an ECAM with any one of the GRANTED_MODE codes based on a user profile and/or configured parameters. In a "Dormant state", the BSC can monitor for the explicit origination messages and check for the compromised flag and notifies the PDSN 22 to terminate the PPP session as illustrated in FIG. 5 (via A10/A11 R-P interface for example) and sends an ECAM message with a GRANTED_MODE set to either 10_Suspension of data services or 11_Suspension of voice & data services. In an "Activate state", if the mobile radio is in an active data session, the BSC will monitor for a mobile_release message and an explicit origination message and check for the compromised flag and notify the PDSN to terminate the PPP session as well as send an ECAM message with one of the defined GRANTED_MODE codes. If the mobile radio is in an active voice session, the RAN or BSC 20 will monitor for the mobile_release message and the explicit origination message and send an ECAM message with one of the defined GRANTED_MODE codes as illustrated in FIG. 6. If the mobile radio is in a termination or suspended state, the BSC 20 can check the stored parameters, the BSC 20 will not page the mobile radio and will notify any callers with a busy tone. Note, the mobile radio can be configured to receive known virus updates over-the-air via OTAPA. As an alternative, OTAPA can be used to suspend a mobile station specific service and alert user(s) accordingly.

In a base station controller assisted implementation of a radio access network defense system, during an active state (data related services with active PPP session), a Packet Control Function (PCF) can act as a passive proxy/relay agent and passively monitor the IP session (PPP session) between mobile-client and server (PDSN) (A8/A9 to/from A10/A11) as shown in FIG. 9. This implementation can be part of a defense-in-depth scheme to provide layers of detection and suspension/notification. It provides another in-depth layer of detection in a network. Referring to FIGS. 2, 7, and 8, the PCF can act as a passive proxy/relay agent to monitor (the A8/A9 & RP-Interface) data Packets. For example, the PCF can monitor and check for Malicious fragmented IP packet patterns which can include IP fragmented packets that are legitimate IP packets by themselves but when un-fragmented and combined become malicious. The PCF can also monitor and check for Continuous ICMP ping with random destination IP addresses, for any unknown applications IP UDP/TCP port numbers, for any unusual PPP re-negotiation (potential PPP session hijacking), for data-grams that are: <{min[negotiated MTU]} or >{max [MTU]}, or for unregistered source and destination IP addresses. Note, parameters (from the OMCR) can be configurable to continuously update any newer known malicious traffic patterns. The PCF can also check and analyze the radio programming (RP)-interface traffic in real-time and compare it to known stored traffic patterns or to an ISP database warehouse server.

The PCF can also act as a reactive agent to Layer-3 Call Control (17) by notifying Layer-3 Call Control to suspend mobile service(s) by releasing RF resources, tearing down a PPP session, and sending an explicit General Page with a defined "SPECIAL_SERVICE" message element. The PCF can then enable the recording and storing of mobile station data using SCR (selective call receiver) update and further updates the MSC/HLR/VLR. The PCF can also initiate patch or suspension service updates to the mobile radio or station 12 via OTAPA.

Referring to FIG. 9, a flow chart illustrating a security method 100 in a radio access network can include the step 102 of monitoring (by either a base station controller or a mobile radio in the radio access network) for one or more abnormalities among CPU utilization, memory storage, memory read-write, malicious incoming or outgoing messages, and virus file names, notifying of a specific abnormality detected via a wireless communication link at step 104, and controlling or receiving access, conditional access or limited access via the wireless communication link at step 108 based on the specific abnormality detected and further mitigating the effects of the abnormality on the radio access network at step 109 (which can be done in any number of ways). The method 100 can further include the step 112 of receiving updates used for monitoring the one or more abnormalities. The method 100 can further include the optional step 106 of issuing a notification from a mobile radio to a base station controller if the specific abnormality is detected and suspending at step 110 one or more services being provided to the mobile radio based on the specific abnormality detected. In this regard, the method 100 can include the step of issuing a notification from a mobile radio and receiving a response from a base station controller causing the mobile radio to perform one of the functions among suspending data services, suspending data services and voice services, canceling suspension of data services, and canceling suspension of data services and voice services. The method can further include the step 114 of receiving at the mobile radio an over the air programming instruction to suspend a specific service and alerting the mobile radio. The method 100 can also include the step 116 of isolating a mobile radio operating system from an air interface layer. In this manner, denial of service attacks can be prevented by monitoring behavior of mobile radios in communication with the radio access network and flagging the specific abnormality detected. Also, packet data service at a mobile radio can be suspended upon detection of a malicious software routine in the mobile radio while continuing to enable voice or circuit data calls.

With announcements that certain viruses, worms or other malicious programs have been ported to mobile phone platform as well as the advancements and great achievements in the wireless network industry in terms of technology integration and more devices accessing the RAN, the needs for security protocols to protect the network becomes more important than ever. Currently there are methods for protecting the two ends of a wireless system, mainly the mobile and the Internet, however, with all this technology integration, the RAN itself might be overlooked and be maliciously overused resulting in a Denial of Service scenario for other MS that have legitimate requests.

The embodiments herein provide a means to resolve some of the security risks involved when such networks and technologies are integrated. Such embodiments can be designed to protect the core RAN system and can prevent mobile subscribers (MS) from overloading the RAN system resources by monitoring the behavior of the MS and looking for specific patterns.

Embodiments herein can be implemented to deny mobile access of the system resources based on only the infected processes/phone capabilities. For example if the MS contains malicious software that is reprogramming the MID or the ESN of the mobile to request for more system resources for Packet Data Services, then only call originations with those service options will be denied from taking place, while it still allows for voice or circuit data calls to take place. The flow can indicate that the mobile will inform the RAN of such activities and the RAN will decide on how to proceed. Furthermore, the mobile radio can periodically update the RAN on its progress as well as receive new information on how to deal with the issue at hand. As part of "defense-in-depth" topology, a BSC assisted embodiment during mobile radio or station active data session can provide another layer of detection and notification. Note, the embodiments herein are not limited to CDMA technologies, but can equally be applied to other wireless technologies such as WLAN, WiFi, WiMax, WCDMA, HSDPA, UMTS, etc. . . .

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A radio access network security method, comprising the steps of:
    monitoring for one or more abnormalities among CPU utilization, memory storage, memory read-write, malicious incoming or outgoing messages, and virus file names;
    notifying of a specific abnormality detected via a wireless communication link;
    receiving access, conditional access or limited access via the wireless communication link based on the specific abnormality detected; and
    suspending packet data services at a mobile radio upon detection of a malicious software routine in the mobile radio while continuing to enable voice or circuit data calls.

2. The method of claim 1, wherein the method further comprises the step of receiving updates used for monitoring the one or more abnormalities.

3. The method of claim 1, wherein the method further comprises the step of issuing a notification from a mobile radio to a base station controller if the specific abnormality is detected.

4. The method of claim 3, wherein the method further comprises the step of suspending one or more services being provided to the mobile radio based on the specific abnormality detected.

5. The method of claim 1, wherein the method further comprises the step of issuing a notification from a mobile radio and receiving a response from a base station controller causing the mobile radio to perform one of the functions among suspending data services, suspending data services and voice services, canceling suspension of data services, and canceling suspension of data services and voice services.

6. The method of claim 1, wherein the method further comprises the step of receiving at a mobile radio an over the air programming instruction to suspend a specific service and alerting the mobile radio.

7. The method of claim 1, wherein a base station controller monitors for one or more abnormalities among CPU utilization, memory storage, memory read-write, malicious incoming or outgoing messages, and virus file names and initiates a suspension of service upon the detection of one or more abnormalities.

8. The method of claim 1, wherein the method further comprises the step of isolating a mobile radio operating system from an air interface layer.

9. The method of claim 1, wherein the method further comprises the step of preventing denial of service attacks by monitoring behavior of mobile radios in communication with the radio access network and flagging the specific abnormality detected.

10. The method of claim 1, wherein the method further comprises the step of alerting other mobile radios nearby the mobile radio with the abnormality and causing the other mobile radios to increase a security level or run virus software.

11. The method of claim 1, wherein the method further comprises the step of causing the mobile radio to enter an unslotted mode.

12. A radio access network security system, comprising:
    a transceiver;
    a processor coupled to the transceiver, wherein the processor is programmed to:
        monitor for one or more abnormalities among CPU utilization, memory storage, memory read-write, malicious incoming or outgoing messages, and virus file names;
        notify of a specific abnormality detected among the one or more abnormalities via a wireless communication link;
        receive access, conditional access or limited access via the wireless communication link based on the specific abnormality detected; and
        suspend packet data services at a mobile radio upon detection of a malicious software routine in the mobile radio while continuing to enable voice or circuit data calls.

13. The system of claim 12, wherein the processor is further programmed to receive updates used for monitoring the one or more abnormalities.

14. The system of claim 12, wherein the system comprises a mobile radio that is programmed to issue a notification from the mobile radio to a base station controller if the specific abnormality is detected and the system performs at least one among the functions of:
    disabling an infected service for a predetermined amount of time,
    refusing a resource assignment for a flagged application,
    redirecting the mobile radio to an analog service, instructing other geographically nearby mobile radios to increase their security level,
    instructing other geographically nearby mobile radios to run virus software,
    preventing peer-to-peer communications,
    preventing access to a mobile radio's address book by other normally trustworthy appearing wireless devices, increasing security levels at mobile radios in recent communication with the mobile radio or that are in the mobile radio's address book, buddy list or recent call list, instructing the mobile radio to enter into a battery draining mode, or instructing the mobile radio to enter a location finding mode.

15. The system of claim 14, wherein the system is further programmed to suspend one or more services being provided to the mobile radio based on the specific abnormality detected.

16. The system of claim 12, wherein the system is further programmed to issue a notification from a mobile radio and receive a response from a base station controller causing the mobile radio to perform one of the functions among suspending data services, suspending data services and voice services, canceling suspension of data services, and canceling suspension of data services and voice services.

17. The system of claim 12, wherein the system is further programmed to receive at a mobile radio an over the air programming instruction to suspend a specific service and alert the mobile radio.

18. The system of claim 12, wherein one among a mobile radio and a base station controller monitors for one or more abnormalities among CPU utilization, memory storage, memory read-write, malicious incoming or outgoing messages, and virus file names and initiates a suspension of service upon the detection of one or more abnormalities.

* * * * *